Feb. 14, 1928.
E. S. HUDSON
WINDSHIELD HEATER
Filed April 25, 1927  3 Sheets-Sheet 1
1,659,487
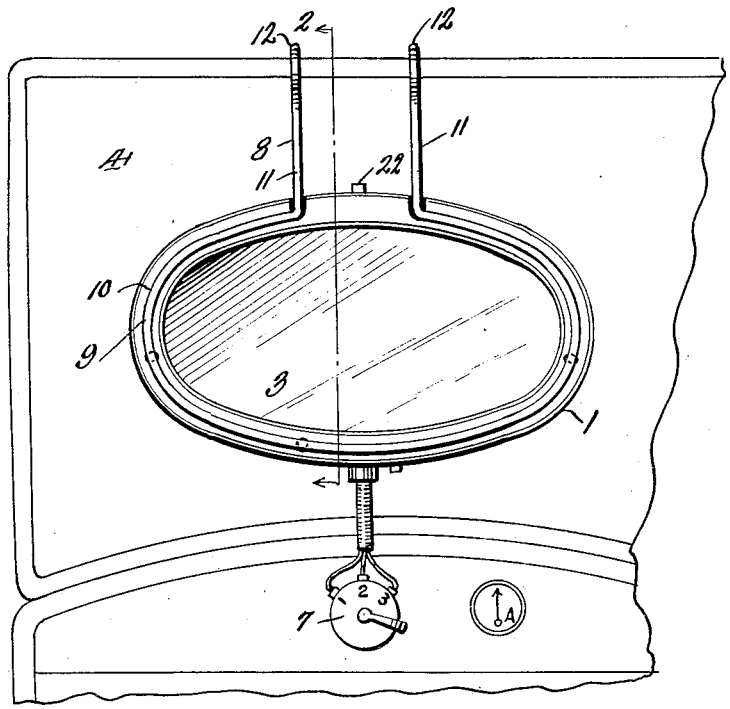
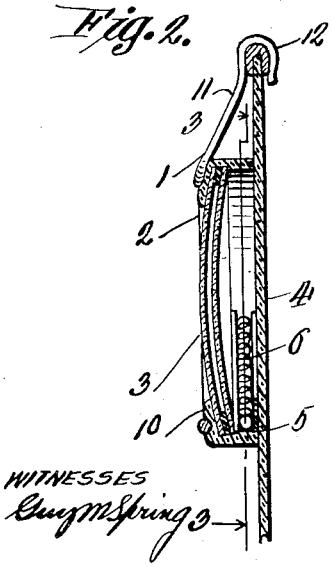
Inventor
EDWARD S. HUDSON Feb. 14, 1928.
E. S. HUDSON
WINDSHIELD HEATER
Filed April 25, 1927
1,659,487
3 Sheets-Sheet 2
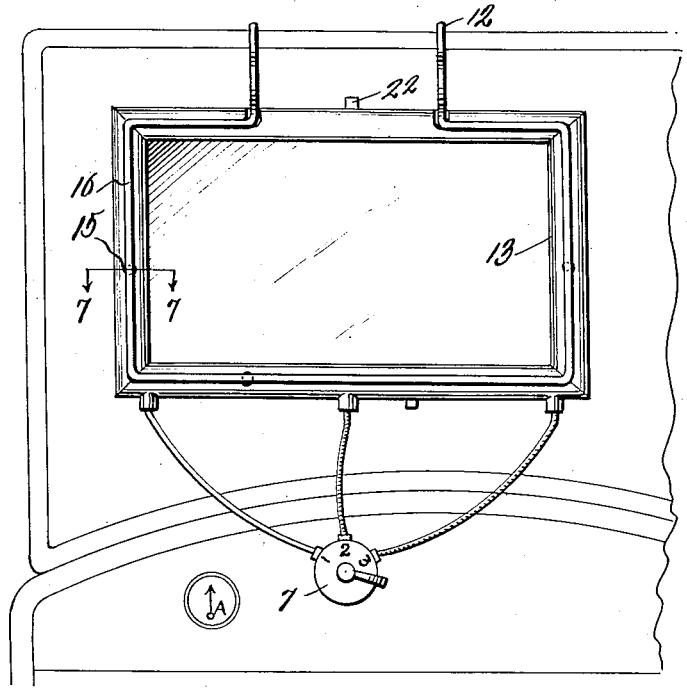
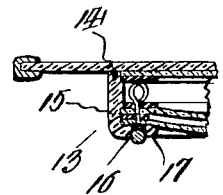
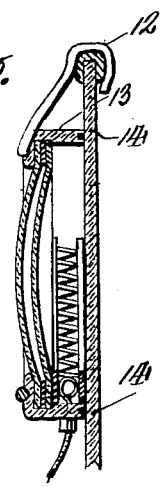
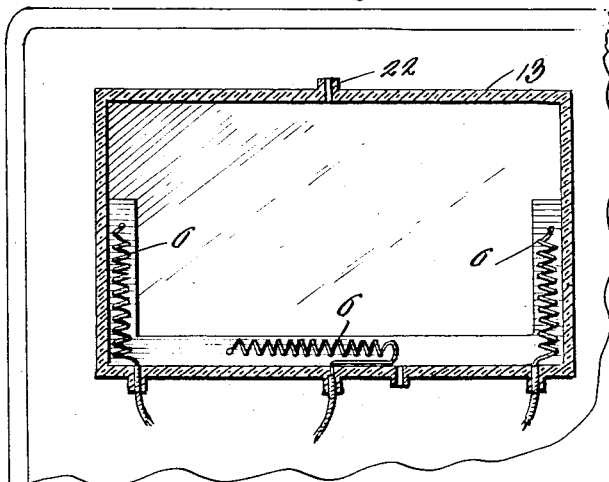
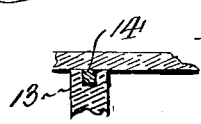

Feb. 14, 1928.
E. S. HUDSON
WINDSHIELD HEATER
Filed April 25, 1927
1,659,487
3 Sheets-Sheet 3
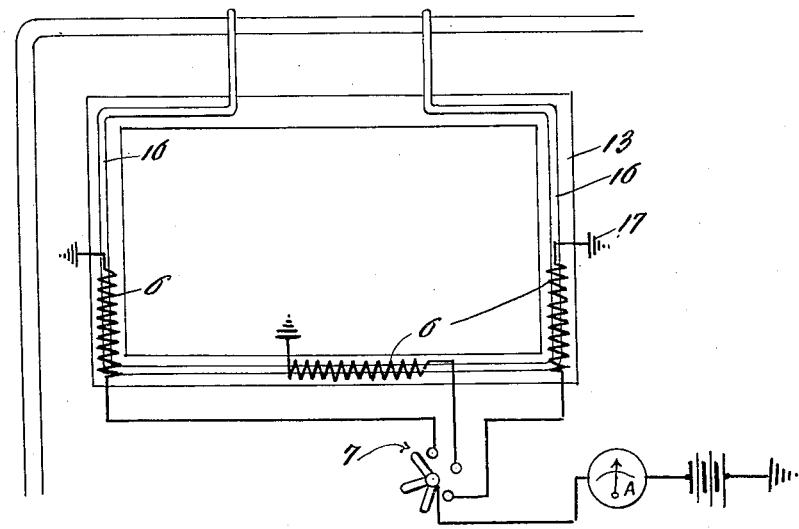
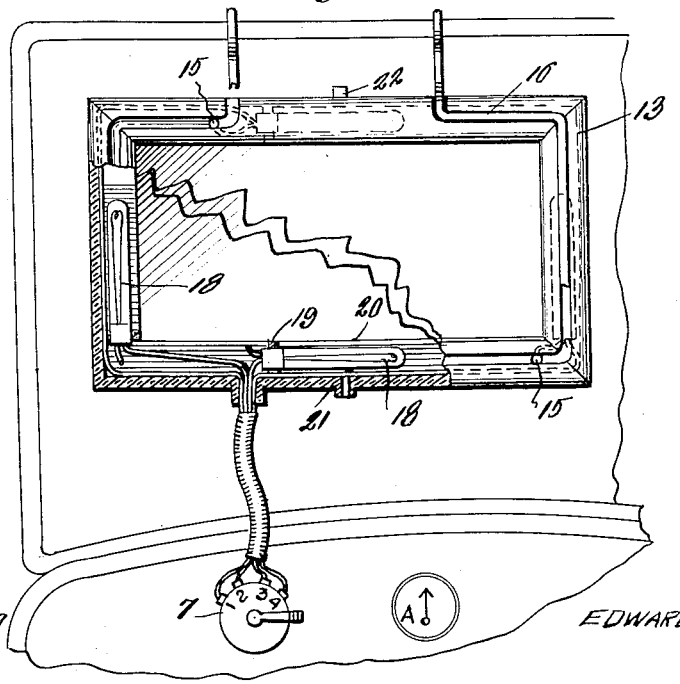
WITNESSES
Inventor
EDWARD S. HUDSON
By
Richard B. Owen, Attorney Patented Feb. 14, 1928.

1,659,487

UNITED STATES PATENT OFFICE.

EDWARD S. HUDSON, OF CEDARVILLE, MICHIGAN.

WINDSHIELD HEATER.

Application filed April 25, 1927. Serial No. 186,443.

This invention relates to a windshield heater, and has for its primary object the construction of a device that will keep clear a predetermined portion of the windshield under all conditions so that the operator of the automobile may have clear vision.

An object of the invention is the construction of a device incorporating heating elements so positioned as to keep a portion of the windshield heated so as to prevent accumulation of ice, sleet or moisture.

An object of the invention is the construction of a device that may be readily clamped in place and, when in place, positions a glass panel and a portion of the windshield in direct alignment with the eyes of the operator.

Besides the above, my invention is distinguished in the novel manner of constructing and assembling the various parts so that the manufacturing cost is materially reduced and the renewal of a part readily taken care of.

With these and other objects in view, my invention will be better understood from a description of the same when taken in connection with the accompanying drawings, wherein:—

Figure 1 is a front elevation of one form of the invention;

Figure 2 is a vertical sectional view;

Figure 3 is a longitudinal sectional view;

Figure 4 is a front elevation of another form of the invention;

Figure 5 is a cross sectional view;

Figure 6 is a longitudinal sectional view;

Figure 7 is a detail sectional view on the line 7—7 of Figure 4;

Figure 8 is a diagrammatic view illustrating the circuits;

Figure 9 is a view of another form of my invention;

Figure 10 is a detailed cross sectional view of the frame illustrated in Figure 5.

Again referring to the drawings, and more particularly to that construction shown in Figures 1, 2 and 3, the numeral 1 designates the frame formed of any suitable material but preferably of insulating material and of a construction to provide a sight opening 2 preferably closed by the glass panels 3. This frame is arranged in abutting relation to the windshield 4 and has its rear end open so that a support 5 may be slipped into the frame into abutting relation with the glass panels. This support receives and supports the heating elements, shown in this particular case as resisting coils 6, which may be of any required number and arranged in the most advantageous position so that the heat developed thereby may act upon the glass panel and the enclosed portion of the windshield, and thus the temperature thereof is materially increased to prevent the accumulation of snow, sleet or moisture. These coils are arranged in various circuits, as shown in Figure 8, to be selectively or jointly energized by the manipulation of the switch 7 arranged in convenient reach of the operator. Thus the temperature of the device may be controlled according to the requirements.

Any suitable means may be provided for supporting the device in its proper position, but a simplified manner of accomplishing this desired result is by the use of the clamp 8 illustrated. This clamp 8 is formed from a single length of wire bent to provide the attaching section 9 seated in the groove 10 of the frame and provided with parallel limbs 11 that terminate in hooks 12 engaging around the upper edge of the windshield. I wish to call attention to the fact that the limbs 11 are so shaped as to provide a yieldable action for forcing the frame into proper engagement with the contiguous surface of the windshield.

In Figures 4 to 8 inclusive, I have illustrated the frame 13 as of rectangular configuration and provided in its rear edge with a gasket 14 which will be made of resilient material to provide an air-tight connection between the frame and the windshield. The other structural features of this form of my invention are identical with that just described, with the exception that I provide each coil with a contact 15 passing through the frame to be ground on the frame 16, as indicated at 17, so that current may return to the battery by way of the metallic portion of the windshield.

In Figure 9, I have dispensed with the resistance coils and arrange a plurality of elongated electric bulbs 18 in the sockets 19 carried by the support 20. It is, of course, to be understood that these bulbs may be housed in any desired manner to prevent glare or an illuminating effect and, if found advantageous in practice, the frame may be provided with an opening 21 for discharging light rays downwardly toward the instrument board of the automobile. Thus the electric bulbs may perform the dual function of properly heating the glass panel and windshield and to direct light rays in a required direction to be utilized.

It will be noted that each of the heaters is provided with a vent opening 22 for establishing communication between the space between the panels and the atmosphere so as to prevent condensation or other accumulations from adhering to the inner surface of the panels.

It is, of course, to be understood that the various parts of the device may be constructed in various other manners than illustrated and associated in other relations and the heater may be attached to the windshield in various other ways than illustrated and, therefore, I do not desire to be limited in any manner except as set forth in the appended claims.

I claim:—

1. A windshield heater comprising a frame, a glass panel forming the front of the frame, a support adapted to be slipped into the frame for abutting engagement with the glass panel, heating elements carried by said support, a clamp for the frame, said clamp being bent from a single length of wire to provide an attaching section seated in the groove in the frame, and hook-shaped extremities for engagement over the windshield.

2. A windshield heater comprising a frame of insulating material, a plurality of electric heating elements supported within the frame and a metallic clamp passing around the frame and terminating in attaching hooks, said elements each having a terminal ground on said clamp.

3. A windshield heater comprising a frame of insulating material, a plurality of electric heating elements supported within the frame, a metallic clamp passing around the frame and terminating in attaching hooks, said elements each having a terminal ground on said clamp and a pair of glass panels arranged in spaced parallel relation to one side of said heating elements.

In testimony whereof I affix my signature.

EDWARD S. HUDSON.